Aug. 11, 1970   K. MAECKER ET AL   3,524,111
CONTACTLESS LIMIT SWITCH FOR MACHINE CONTROLS, ESPECIALLY
MACHINE TOOLS

Filed Nov. 30, 1965   7 Sheets-Sheet 1

INVENTORS
Kurt Maecker
Wolfgang Kniel
By
Patent Agent

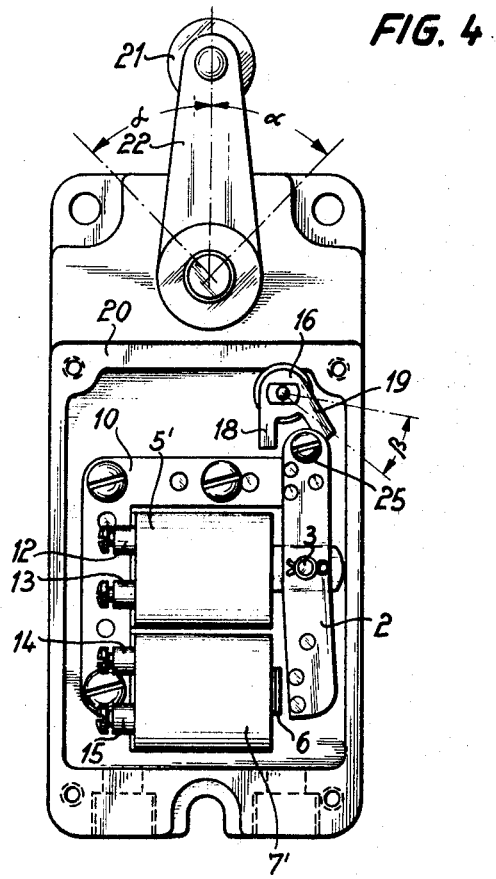
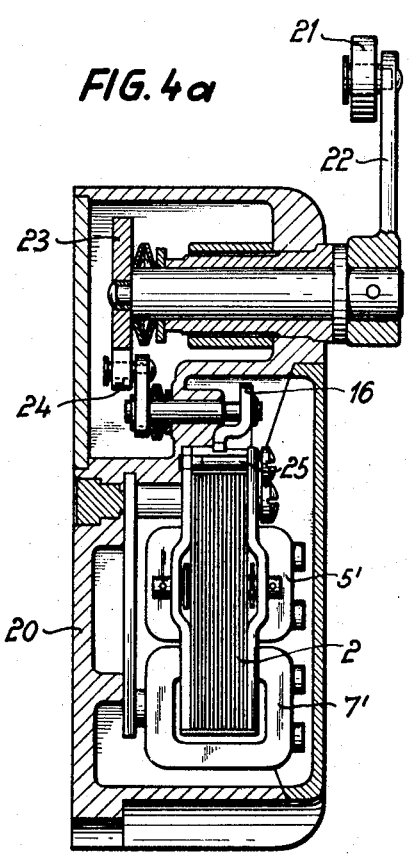

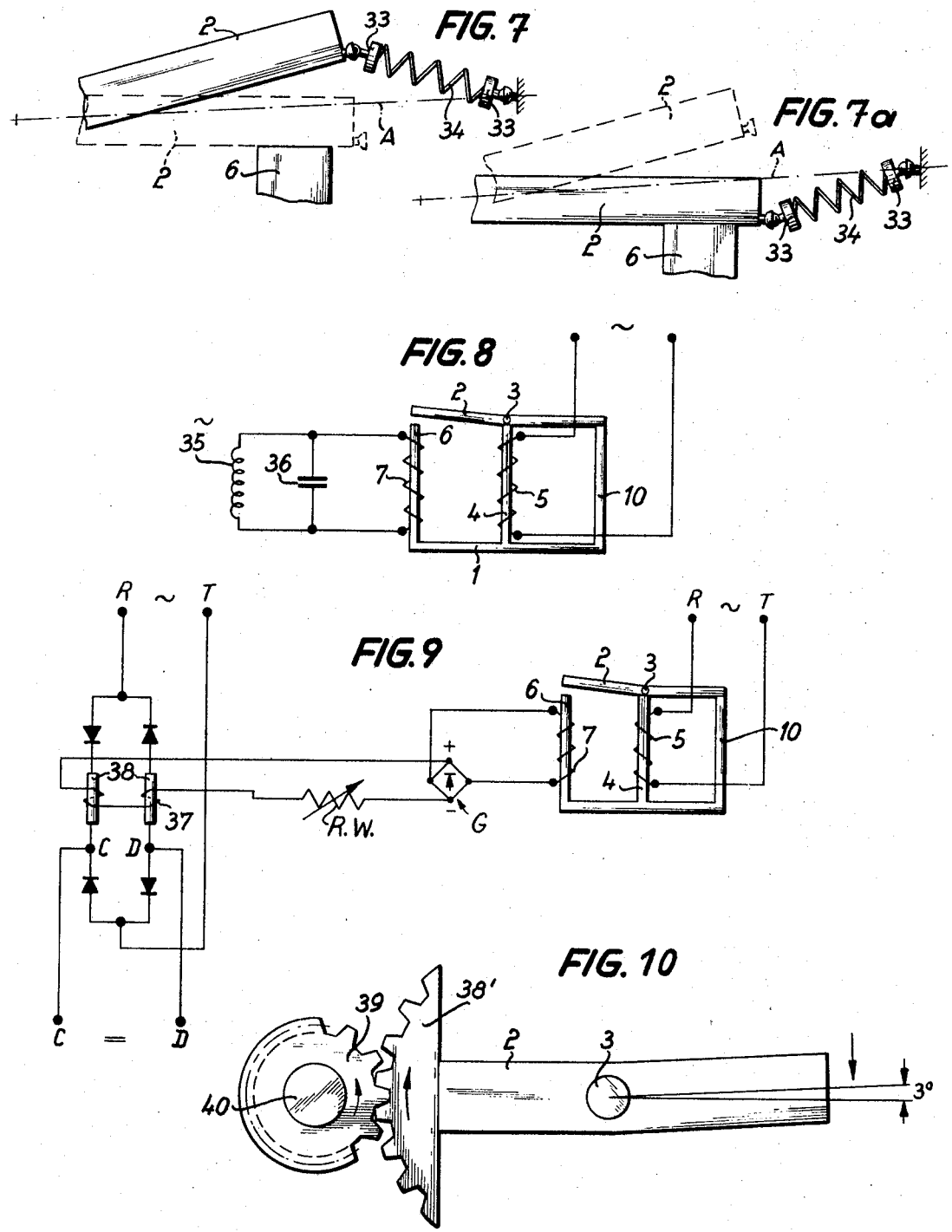

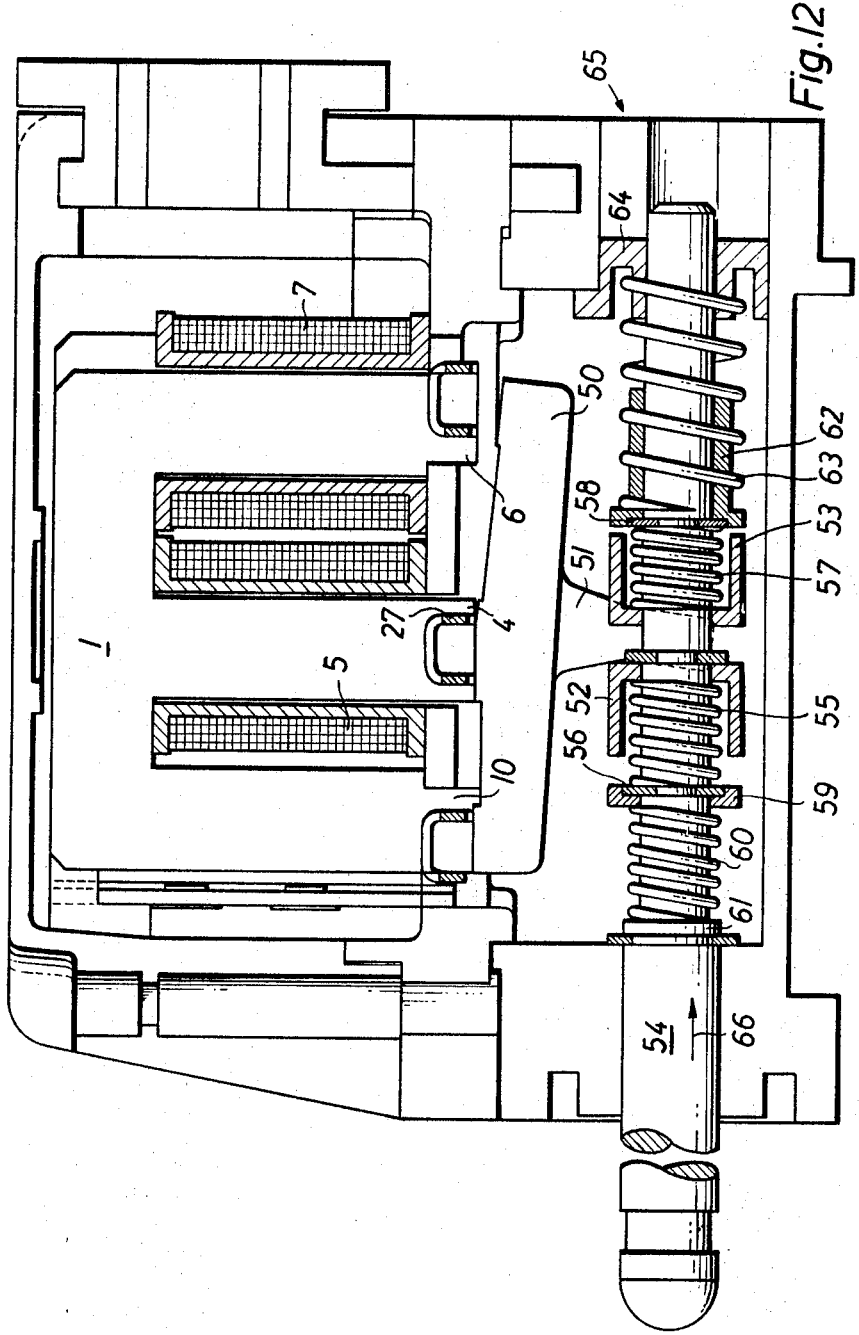

United States Patent Office 3,524,111
Patented Aug. 11, 1970

3,524,111
CONTACTLESS LIMIT SWITCH FOR MACHINE CONTROLS, ESPECIALLY MACHINE TOOLS
Kurt Maecker, Oststrasse 119, Dusseldorf, and Wolfgang Kniel, Stuttgart, Germany, said Kniel assignor to said Maecker
Continuation-in-part of application Ser. No. 862,426, Dec. 28, 1959. This application Nov. 30, 1965, Ser. No. 522,804
Claims priority, application Germany, Dec. 29, 1958
M 40,070
Int. Cl. H01h 47/00
U.S. Cl. 317—155.5    15 Claims

ABSTRACT OF THE DISCLOSURE

A contactless limit switch for machine controls, especially machine tools, which includes a transformer core with two legs, each having a coil thereon, and with a third leg without a coil, a movable actuating member for establishing a connection of two of said three legs, and having two end positions while being operable by an outer mechanical drive, the actuating member including a tiltable member operable in one position to close the transformer-iron path while in another end position closing the shunt-iron path while always producing a magnetic closing circuit between the central leg carrying the primary winding and one of the other legs, whereby an instantaneous increase and drop in the voltage produced in the secondary winding will be effected.

---

The present invention is a continuation-in-part application of our copending application Ser. No. 862,426, filed Dec. 28, 1959, entitled "Switch System" and now abandoned.

The present invention relates to a switch, especially for the electric control of machines.

Switches, particularly limit switches for electrical machine control systems which are built into the machine or attached thereto, are subjected to continuous harmful outer influences such as mists caused by cooling means for the tools of machine tools, oil mists of oil lubricated transmissions, vibrations of presses and milling machines, influences of the weather and temperature variations of conveying systems. If machines are involved which are installed in tropical areas, the said temperature variations are considerable.

The above-mentioned influences endanger the switch safety of the switches to an extent which is not permissible with regard to the controlled cycle of such machines. The situation is further aggravated by the fact that with machine controls more and more lower voltages are employed for the actuation of couplings and tube controls whereby the liability to disorders of the electric contacts is further increased.

In an effort to reduce the above-mentioned harmful influences, the switches have been more and more encased or enclosed. If a satisfactory seal is to be obtained, such enclosures become larger and larger which makes the installation of enclosed switches more difficult inasmuch as the space available for the installation of such switches is generally rather limited. Therefore, it was attempted to overcome these difficulties by providing switch mechanisms operating according to the induction principle, in which electric contacts are completely eliminated. Thus, the respective machine was provided with induction coils while the table of the machine was provided with an armature element which together with the table was moved by said coils so that the respective induced voltage brought about the intended switching action. However, such known systems have various drawbacks.

For instance, if the control actions have to have the required precision, it is necessary that the armature element connected to the carriage of the machine be very precisely arranged with regard to the induction coils.

Furthermore, the parts of such induction switch mechanisms were mounted on the machine completely open so that it could not be avoided that chips or dirt particles entered the induction coils. Even though the deposit of dirt does not cause the same difficulties as are encountered with contact switches, nevertheless the deposit of chips will harmfully affect the magnetic field and endanger the precision of the controls.

Still another important drawback of the above-mentioned switch mechanisms consists in that the movement of iron elements, for instance tools, near said coils is liable to release a switch impulse.

It is, therefore, an object of the present invention to provide a switch which will overcome the above-mentioned drawbacks.

It is another object of this invention to provide a switch of the above-mentioned general type, which will assure that in both end positions there will always be maintained a closed path for the magnetic flux.

A further object of this invention consists in the provision of a switch as set forth in the preceding paragraph, which will make it possible without additional steps to maintain low the magnetizing current of the primary coil.

It is also an object of this invention to provide an induction switch which will permit the employment of small windings without the danger of a non-permissible heat development.

Still another object of this invention consists in the provision of an induction switch of the above-mentioned type which will assure a very precise and reliable operation and will bring about a shock-like increase in voltage in the secondary coil without any gradual increase in the voltage.

These and other objects and advantages of the invention will appear more clearly from the following specification in connection with the accompanying drawings, in which:

FIG. 4 shows a switch as illustrated in FIGS. 3 and 3a as it would appear when built into a limit switch housing known per se, the lid of said housing being removed.

FIG. 4a is a section taken along the line IVa—IVa of FIG. 4.

FIG. 7 illustrates a mechanical intermittent switch mechanism aiding the magnetic intermittent switch mechanism.

FIG. 7a illustrates the arrangement of FIG. 7 with the spring shown therein in a different position.

FIG. 8 illustrates a switch according to the invention having an alternating current relay connected to one of its secondary windings.

FIG. 9 shows the switch of FIG. 8 with one of its secondary windings connected to the control winding of a magnetic amplifier.

FIG. 10 illustrates a tiltable yoke for a switch according to the present invention in cooperation with a gear segment which serves as an actuator for the tiltable yoke.

FIG. 12 shows a switch mechanism similar to that of FIG. 11 but differing therefrom in the arrangement of the primary and secondary windings of the transformer core.

GENERAL ARRANGEMENT

Figure 1:
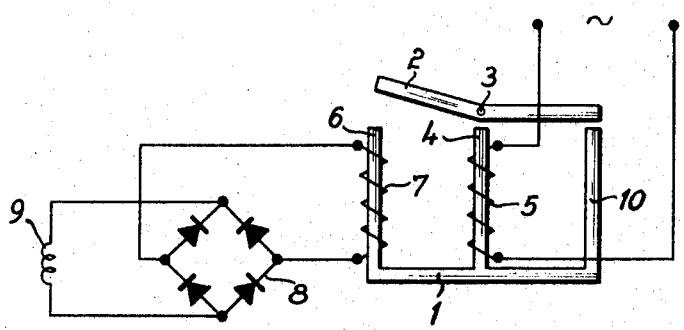
FIG. 1 is a diagrammatic illustration of a switch according to the invention in which in addition to the leg with the primary winding there is provided a leg with a secondary winding and a stray leg without winding.

In order to overcome the drawbacks outlined above and inherent to heretofore known switch mechanisms, according to the present invention there are provided one or more relays adapted to respond to the changes in the flux in a transformer having an iron core with at least two legs while in each switch position one of the core legs and the leg surrounded by the primary winding form a closed ring together with a tiltable yoke which is tiltable about an axis located perpendicular to the central longitudinal plane of said transformer which plane passes through the core, at least one of the core legs of said transformer carrying a secondary winding.

According to a further development of the invention, the transformer comprises a three-legged open iron core while the movable yoke in each switch position thereof will interconnect two legs so that the thus created connection of two legs forms a path for the magnetic flux whereby induction voltages are created for actuating the relay.

In conformity with a further embodiment of the invention, one of the outer core legs of the transformer carries a short-circuited secondary winding, whereas the primary winding is arranged in series with the working coils of all relays when the transformer comprises said short-circuited winding as the only secondary winding. According to a modification, the primary winding is arranged in series with a portion only of the relay coils when the third leg of the transformer additionally carries an open secondary winding.

In the first-mentioned one of the two last-mentioned instances, one of the outer core legs carries no winding.

In conformity with a further development of the invention, the yoke is designed as a two-arm lever. In this way, it will be assured that in both end positions of the yoke, there will always be a closed path for the magnetic flux whereby the magnetizing current of the primary winding will be kept low without additional means. The dimensions of the windings may, therefore, be small and the danger of a nonpermissible heat development will be eliminated. The air gap at the side of that leg which at the respective time is not connected, may likewise be kept rather small. Thus, only small strokes or movements of the yoke will be necessary during the actuation thereof.

If one of the secondary windings is designed as a short-circuit winding, the device according to the present invention will act so that when the respective portion of the tiltable yoke engages that leg of the transformer which carries the short-circuit winding, the transformer will suddenly be under a considerable load. As a result thereof, the impedance of the primary winding will drop practically instantaneously. This, in turn, means that those relay coils which are in series with the primary winding and connected to the network will be under increased voltages so that the relays will respond. If, however, the respective portion of the tiltable yoke engages the empty leg, the impedance of the primary winding will become very high, and the relay coils will not respond but will drop off.

With the arrangement set forth in the preceding paragraph, the switching mechanism has the following advantages:

The transformer requires only two terminals. Furthermore, the current passing through the primary winding when the short-circuit winding is made effective, and thereby the magnetic flux in the transformer, is limited by the resistance of the consumer, i.e. the relay coils. This limit may be selected so low that the transformer leg carrying the circuit winding may be held relatively small as to its cross-section. This, in turn results in a short medium length of the short-circuit winding and thus in a low resistance, a low stray permeance and in a low self-impedance of the system. In this way, due to the small space requirements for the secondary winding, the primary side can be considerably greater and can, therefore, be dimensioned for higher total outputs.

The arrangement of the primary winding and the consumer or consumers in series will bring about the following favorable results:

On one hand, the primary winding of a plurality of transformers may be arranged in series with the consumer or consumers. If in these circumstances—which can easily be effected—an impedance ratio is created of approximately 100:1 between idling position and the position in which the short-circuit winding is made effective, a sufficiently high voltage will occur at the consumer or consumers only if, with all transformers the short-circuit winding has been made effective, in other words, if all transformers are in working position. If, on the other hand, the primary windings of a plurality of transformers are arranged in parallel, and if the group is then arranged in series with the consumer or consumers, the consumer or consumers will obtain a sufficient voltage as soon as the short-circuit winding of one of the transformers is made effective. In both instances, the switch arrangement will primarily act like a contact system.

The small space requirement of the short-circuit winding makes it possible to design the merging cross-sections between stand and tiltable yoke rather large. This, in turn, brings about a reduction in the magnetic induction and an increase in the idling impedance. Furthermore, at otherwise the same conditions, those magnetic forces decrease which are produced at the flux transgression points. This means that also the actuating force—when, for instance employing the device as contact of an inductive magnetic relay—will decrease so that the actuating magnet may be reduced as to size and output. This, in turn, furnishes the possibility to reduce the power required for the actuating magnet to such an extent that it can be controlled without difficulty by an inductive switch element.

In conformity with the present invention, the switch arrangement may also be so designed that the secondary winding will form an open secondary winding. Also the intermediate leg of the transformer may carry the primary winding, whereas each of the other legs will carry a secondary winding. In this connection, the movable yoke of that leg which carries the primary winding will be connected with one of the two legs which carry the secondary winding. In both end positions of the switch, it will thus be possible to control a relay.

In all instances, the pivot point of the movable yoke is located above that leg which carries the primary winding. The yoke in form of a two-arm lever will have one end portion contacting one of the two other legs, whereas the other end portion will be in lifted-off condition with regard to the leg pertaining thereto.

This arrangement makes possible a particularly favorable actuation of the switch element. During the lifting-off from one leg, the yoke has to be moved only up to approximately its intermediate position. As soon as this position has been reached, the magnetic pulling forces of the other leg becomes so strong that the yoke will instantaneously be caused to contact the last-mentioned leg. Therefore, this arrangement makes possible a safe switching and assures a very precise and reliable operation of the arrangement because each time the voltage increase in the secondary part will occur instantaneously without any creeping increase in the voltage.

In conformity with a further development of the invention, the ends of the transformer tiltable yoke have embedded therein short-circuit windings or short-circuit rings for acoustically steadying the arrangement. It is, of course, also possible to form short-circuit rings by employing rivets together with brass sheet metal portions, said rivets being located in slots transverse to the ends of the tiltable yoke.

In order to aid the tilting movements of the yoke, according to a further feature of the invention, permanently magnetic effective means are provided for accelerating the tilting movement of the yoke.

The switch elements according to the invention may also be provided with a hydraulically or pneumatically operable actuating device. Similarly, an expansion body as, for instance a bi-metal strip may be employed as actuating means.

The arrangement according to the invention also advantageously eliminates the influence of primary voltage fluctuations upon the switching operations because the position of equilibrium of the yoke is completely independent from the magnitude of the primary voltage, and the switch movement is effected automatically as soon as the yoke has moved slightly out from its position of equilibrium toward one or the other side.

If, instead of direct current relays, alternating current relays are to be connected to the switch arrangement, a condenser may be arranged in parallel to each relay coil for purposes of phase compensation. The attraction and drop voltage of a relay may also be adapted to the transformer characteristics by series arrangement of a condenser or by a combination of two or more condensers in series or in parallel.

According to still another feature of the present invention, the intermediate leg itself of the transformer core may be designed as tiltable yoke in such a way that it is rotatably journalled in the fixed yoke and that it forms a tongue which is alternately brought into contact with one or the other of the outer legs angled off so as to form a U shape. This arrangement may be employed with transformers with open secondary windings as well as with transformers having short-circuited secondary windings.

The switch elements according to the invention may be actuated selectively manually or mechanically by engagement with moving parts of the machine to be controlled. According to one embodiment of the invention, the tiltable yoke adapted to interconnect two of the three legs of the transformer core is actuated by a fork with two spaced arms for alternatingly engaging one end portion of the tiltable yoke. Said fork, in turn, is actuated by lever means extending into the path of a moving part of the machine to be controlled. According to another embodiment of the invention, the tiltable yoke has a foot portion which is adapted to be engaged by a push-rod extending into the path of a moving machine part so that upon axial movement of said push-rod the yoke is tilted into one or the other of its control positions.

STRUCTURAL ARRANGEMENT

Referring now to the drawings in detail, and FIG. 1 thereof in particular, the arrangement diagrammatically shown therein comprises a three-legged transformer core 1 which is arranged below a movable yoke 2. The pivot 3 of yoke 2 is located above the intermediate leg 4 of the transformer core 1, which leg 4 carries the primary winding 5 fed by the network. As to the other two legs at both sides of leg 4, leg 6 carries the secondary winding 7 having a direct current relay 9 connected thereto through the intervention of a rectifier 8.

The third leg 10 of the transformer core is a stray leg without a winding. As long as no current is induced in the secondary winding 7, the said stray leg in cooperation with the movable yoke 2 establishes a path for the magnetic flux produced by the primary voltage.

Figure 2:
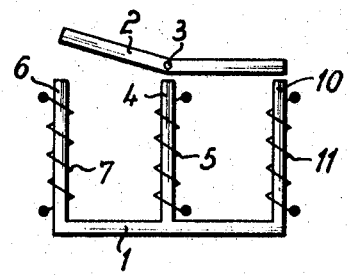
FIG. 2 is a diagrammatic illustration of the switch according to the invention in which one leg carries the primary winding, whereas each of the two other legs carries a secondary winding.

The individual parts of the arrangement shown in FIG. 2 correspond to those in FIG. 1. Leg 10 in FIG. 2, however, carries a secondary winding 11 through which a further relay may be actuated in a manner similar to relay 9 of FIG. 1. With such a switch, depending on the position of the movable yoke, a secondary current will be induced in winding 7 or in winding 11.

Switches of the type set forth in FIG. 1 may advantageously be employed with step or overlapping control circuits.

Figure 3:
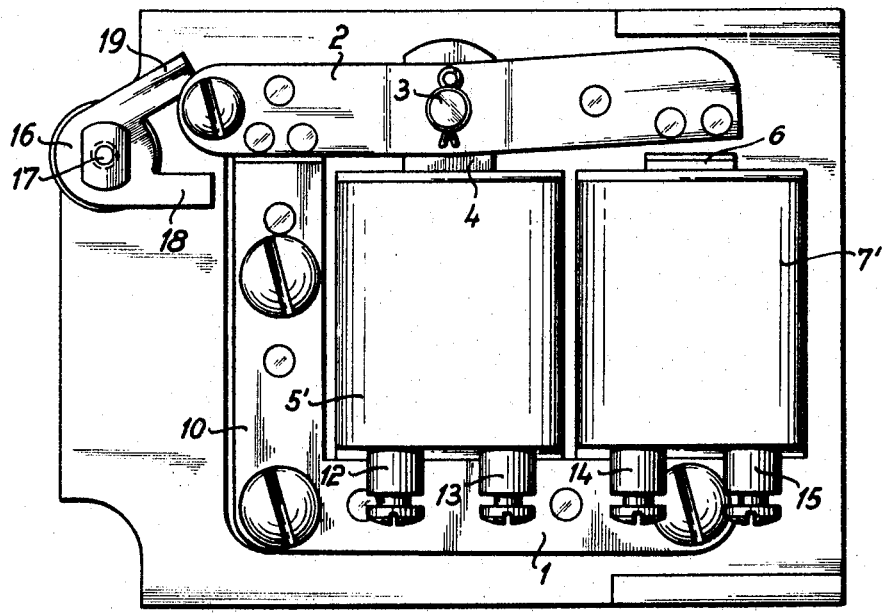
FIG. 3 is a view of the switch illustrated diagrammatically in FIG. 1 but showing in more detail the magnetic core and tiltable yoke and the yoke actuator.
Figure 3A:
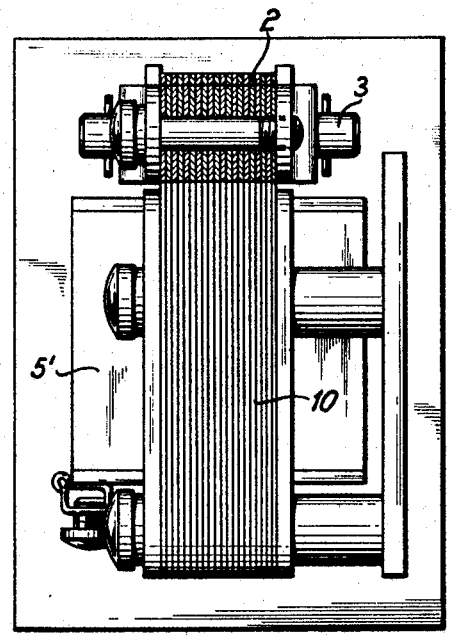
FIG. 3a is a view looking in from the left side of FIG. 3 but with the yoke actuator removed.

According to the arrangement of FIGS. 3 and 3a, the transformer core 1 is made of ordinary dynamo sheet metal. Leg 10 is a stray leg without winding. The intermediate leg 4 carries the primary winding 5' which is adapted through the intervention of terminals 12 and 13 to be connected to the network. Leg 6 carries the secondary winding 7' with terminals 14 and 15 for connection with a relay. The movable yoke 2 is made likewise of dynamo sheet metal and is tiltably journalled on the intermediate leg 4.

For actuating yoke 2, according to a further development of the invention, a tiltably journalled two-pronged fork 16 is provided which is tiltable about its pivot 17 in order to bring about a switching operation. When such switching operation is carried out, arm 18 of fork 16 contacts the outer end of yoke 2 and lifts the latter off from stray leg 10 first into an intermediate position of equilibrium in which the magnetic forces acting from legs 6 and 10 upon the two ends of yoke 2 are of the same magnitude. As soon as yoke 2 at the side of the stray leg 10 is lifted only slightly beyond the said point, the other end of yoke 2 is attracted by leg 6 carrying the secondary winding 7' so that yoke 2 will shock-like be tilted and now the path through leg 6 for the magnetic flux will be established. At the same time, a current will be induced in secondary winding 7' as well as a voltage the magnitude of which will correspond to the transmission ratio of the induction system. According to the present invention, fork 16 is so designed that the tilting movement of yoke 2 will be initiated with a minimum of power inasmuch as the yoke will be moved by arms 18 and 19 of fork 16 up to approximately the central position only. Due to the fact that arms 18 and 19 of fork 16 are spaced apart to an extent which exceeds the width of the engaging end of yoke 2, it will be obvious that when one arm 18 or the other arm 19 during a shifting operation engages yoke 2, there will remain a distance between the other arm and yoke 2 which is so great that yoke 2 will not be impeded in its movement during the sudden tilting movement after the intermediate position has been exceeded.

The switch shown in FIGS. 4 and 4a is installed in a limit switch housing 20 known per se in order to prevent the magnetic path from being affected by iron chips and the like. According to the present invention, this housing is made of non-magnetic substances, such as moldable synthetic material or non-ferrous metal as, for instance pressure cast aluminum. In this way, the induction system will be prevented from magnetizing the housing, and chips or other iron parts are prevented from collecting on the housing.

The switching operations of this arrangement are initiated mechanically by causing a movable part of the machine to be controlled, for instance the carriage, to abut against a roller 21 of a lever 22 protruding from the housing. The roller lever 22 through the intervention of a cam disc 23 and control lever 24 actuates fork 16. As described above, fork 16 now engages yoke 2 by means of a bolt 25 connected thereto. If roller lever 22 is tilted leftwardly or rightwardly by the angle α, fork 16 moves through an angle β in counter-clockwise direction. Cam disc 23 and control lever 24 are in a manner known per se so designed that fork 16 will always be moved to the same side regardless to which side the roller lever 22 is shifted from its intermediate position. The shifting operation proper is carried out in the manner described above.

When roller lever 22 tilts and fork 16 is being moved, first yoke 2 is not contacted by arm 18 of fork 16. Then arm 18 engages bolt 25 and presses yoke 2 into its central position. Arm 19 of fork 16 will in this position be spaced from bolt 25 to such an extent that the remaining tilting movement of yoke 2 brought about by the attracting force of leg 6 can be carried out in a shock-like manner and independently of the respective movement of the fork. When the roller lever 22 is being moved back into its central position, fork 16 will move in opposite direction, i.e. in clockwise direction with regard to FIG. 4, and will press yoke 2 again in opposite direction so that when the intermediate position is exceeded, again a snap movement of yoke 2 toward the stray leg will be effected.

The switch according to the present invention can be used for a great variety of circuits. According to the present invention, as will be evident from FIG. 1, selectively either a direct current relay or an alternating current relay may be connected to the secondary winding. The employment of a direct current relay instead of an alternating current relay has the advantage that a smaller stray air gap and thus a smaller induction system will be required. When employing an alternating current relay, according to a further embodiment of the invention, a condenser for compensation of the phase angle may be arranged in parallel to the coil. In this way, no greater output is required. Thus, also when employing an alternating current relay, greater dimensions will be avoided.

According to a still further embodiment of the invention, the switch may be actuated mechanically or manually in combination with a magnet amplifier of a type known per se with one or more control windings. By causing the switch instead of the subsequent direct current relay to energize, not energize, counter-energize, or partly energize the control winding of the magnet amplifier, an arrangement is obtained by means of which a completely contact-less switching-on and switching-off and also the control of electric motors will be possible.

When controlling continuous operations as, for instance when controlling the speed of an electric motor, the snap shifting of the switch can be omitted and can be replaced by an automatic actuation of the yoke so that a correspondingly changed voltage or current would be associated with any desired position of the yoke.

Figure 5:
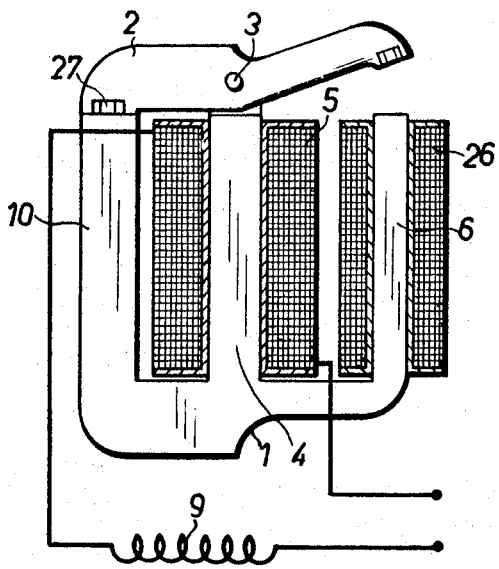
FIG. 5 illustrates a switch mechanism with an outer short-circuit leg and an outer leg without winding, and a tiltable yoke.

According to the arrangement shown in FIG. 5, the intermediate leg 4 of the three-legged open iron core 1 of the transformer is surrounded by the primary winding 5. Above the said leg 4 there is arranged a tiltable yoke 2 which is tiltable about a pin 3 arranged perpendicular to the longitudinal central plane passing through core 1. In the position shown in the drawing, one side of yoke 2 rests upon the stray leg 10 which is not provided with a coil. In this position, the primary winding 5 has a very high impedance so that the current of relay coil 9 will not be sufficient to attract said relay, the relay coil 9 being arranged in series with primary coil 5 and being connected to the network. If, however, yoke 2 is tilted against leg 6 carrying the short-circuit winding 26, the impedance in the primary winding 5 drops almost instantaneously so that the increased current in primary winding 5 and relay coil 9 will make the relay effective. The ends of yoke 2 have inserted therein short-circuit rings 27 for acoustically steadying the system.

Figure 6:
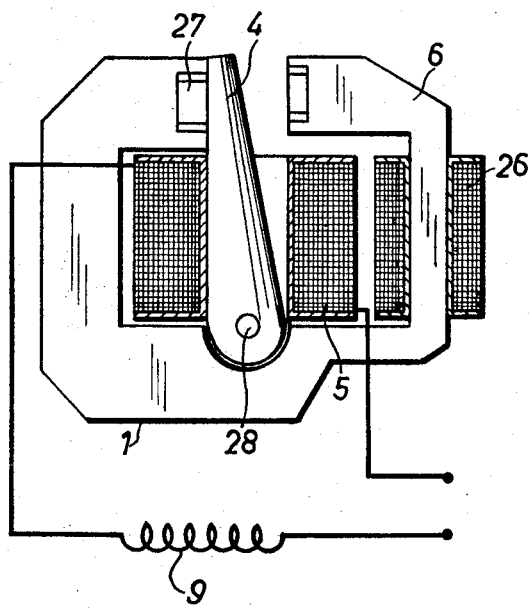
FIG. 6 represents a switch mechanism in which the intermediate leg is designed as tiltable yoke.

Referring now to FIG. 6, it will be seen that the legs 6 and 10 are angled so that each will form a U, leg 6 carrying the short-circuit winding 26. The intermediate leg 4 itself forms the tiltable yoke which is tiltably journalled in the fixed yoke at 28 and is adapted alternately to engage leg 6 or leg 10. The ends of the two outer legs 6 and 10 have inserted therein short-circuit rings 27.

The short-circuit windings of both embodiments of FIGS. 5 and 6 may consist of a copper jacket closed in itself or of a copper ring but, if desired, also of a coil having a plurality of windings with the ends of said coil connected in a conducting manner.

FIG. 7 illustrates a mechanical snap switch mechanism for aiding the magnetic snap switch arrangement. When tilting yoke 2, spring 34 is compressed. When passing beyond the tilting line A, the compressed spring 34 presses against the yoke from above or from below. Spring 34 is rotatably journalled in holding members 33. The outer right-hand leg of the transformer (with regard to FIG. 7) has been designated with the numeral 6.

FIG. 7a shows the arrangement of FIG. 7 but with the spring 34 moved into its position forming an image to the position shown in FIG. 7.

FIG. 8 shows the transformer of FIG. 1, however, so that an alternating current relay with a coil 35 is connected to one of the secondary windings. The numeral 36 represents a condenser.

FIG. 9 shows still another circuit arrangement in which secondary winding 7 of the switch is connected to the control winding means of magnetic control means 37 located in the adjacent ones of the legs of a bridge circuit which connects the bridge input terminals R and T, which are energized with alternating current, with the direct current bridge output terminals C and D. As will be evident from FIG. 9, the secondary coil supplies alternating current to the rectifier bridge G which, in turn, supplies direct current to the control winding means of the magnetic control means. When the control winding means of the magnetic control means are energized to a predetermined degree, the iron core means 38 of the magnetic control means is fully saturated. Under these conditions, the reactance of the load windings of the magnetic control means is at a minimum, and a high voltage will exist at the bridge output terminals C and D. If the current in the control winding means is now reduced either by means of adjustment of the resistance R, W, or by the movement of yoke 2 away from the end of the leg of the core on which secondary winding 7 is located, the degree of saturation of the iron core means 38 will be reduced, the reactance of the load coils will increase, and the voltage at the bridge output terminals C, D will be reduced. The change in voltage effected in this manner at the bridge output terminals C, D can be employed for control purposes. The resistance R, W, can be so adjusted that the change in voltage at terminals C, D when yoke 2 moves from its one end position to the other, is within the proper range to actuate the device connected to the said terminals.

In the present instance, the induction system according to the invention represents a contactless potentiometer.

In order to be able to effect the feeding of the magnetic amplifier in a stepless manner, it is necessary that the tilting of yoke 2 be effected not in a shock-like manner but slowly in conformity with the actuation of the control lever. To this end, the yoke may be provided with a gear segment 38' shown in FIG. 10. As will be evident from FIG. 10, gear segment 38' meshes with a gear 39 supported by a shaft 40.

Figure 11:
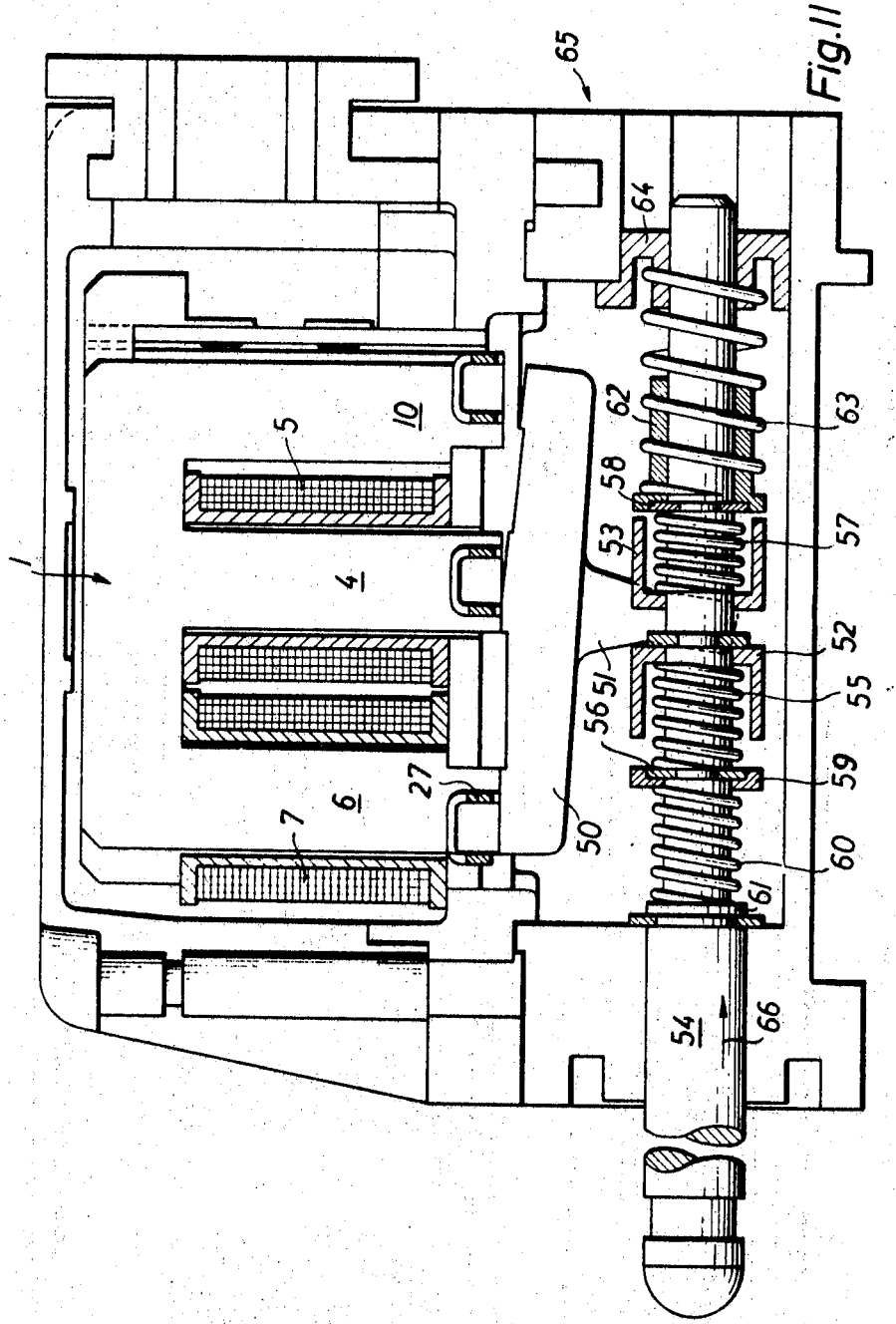
FIG. 11 illustrates a preferred switch mechanism according to the present invention, modified over the arrangement shown in FIGS. 3 and 4 in that the yoke and yoke actuator have been replaced by a rocker and a pushrod therefor.

Two particularly advantageous embodiments are illustrated in FIGS. 11 and 12. Similar to the arrangement shown in FIGS. 3 and 4, the switch arrangements shown in FIGS. 11 and 12 comprise a three-legged transformer core 1 with an intermediate leg 4 carrying a primary winding 5, a leg 6 carrying a secondary winding 7, and a stray leg 10 without winding. In contrast to the arrangement of FIGS. 3 and 4, however, the limit switches shown in FIGS. 11 and 12 are not equipped with a yoke 2 and a fork-shaped actuating member 16 but rather with a yoke or rocker 50 having a foot portion 51.

Foot portion 51 is arranged between two sleeves 52, 53 which are movably mounted on a control push-rod 54. Sleeve 52 is subjected to the force of a spring 55 resting against an abutment 56 while sleeve 53 is subjected to the force of a spring 57 resting against an abutment 58. Abutment 56 is engaged by a spring dish 59 under the influence of a spring 60 one end of which rests against spring dish 59, whereas the other end rests against a collar 61 of push-rod 54. Similarly, abutment 58 has pressed thereagainst a sleeve 62 by means of a spring 63 the opposite end of which rests against an abutment 64 provided in the housing 65 of the switch.

If push-rod 54 is moved by a moving machine part in the direction of arrow 66, spring 55 is pre-loaded by means of sleeve 52 and abutment 56. When spring dish 59 engages sleeve 52, foot portion 51 of yoke or rocker 50 is actuated. Thus, foot portion 51 also moves in the direction of the arrow 66. Since the magnetic force exerted by leg 6 (FIG. 11) decreases in view of the increasing air gap, spring 55 will become strong enough to tilt yoke or rocker 50. Thus, the spring mechanism supports the magnetic force of leg 10 in moving yoke 50 beyond its intermediate position to bring the same into engagement with stray leg 10. Yoke or rocker 50 is made up of laminated sheet metal, as are the legs of the transformer core.

If, in conformity with FIG. 11 the secondary winding 7 is arranged on the left-hand leg 6 of the transformer core 1, the full secondary voltage prevails if the switch is not actuated. Therefore, a relay connected to secondary winding 7 is energized. Upon actuation of push-rod 54, secondary winding 7 will be deenergized and the relay connected thereto will be switched off. Such an arrangement is called a circuit breaker.

The arrangement according to FIG. 12 is identical to that of FIG. 11 with the exception that the primary winding 5 is now arranged on the right-hand leg of the transformer core 1. In this instance, the secondary winding 7 is energized only upon actuation of push-rod 54. Such an arrangement is called a circuit closer.

What we claim is:

1. An electromagnetic control system including: frame means, transformer core means located in said frame means and having two outer legs and one leg intermediate the same, said legs being magnetically interconnected at their one ends while having their other ends spaced apart from each other, primary winding means on one of said legs and adapted to be electrically energized, secondary winding means on a second one of said legs, means operatively connected to said transformer core means and responsive to an increase in the voltage in said secondary winding means, magnetically responsive yoke means arranged adjacent said other ends of said legs and alternately tiltable into first and second operative positions in which said yoke means respectively establishes a closed magnetic path from the other end of said intermediate leg to the other end of the responsive outer leg of said core means while interrupting the magnetic path from the other end of the intermediate leg to the other end of the respective other one of said outer legs of said core means, and actuating means movably arranged in said frame means and adapted to be actuated from outside the latter, said actuating means being operable after a lost motion thereof relative to said yoke means in one direction to tilt the latter toward said first operative position and after a lost motion relative to said yoke means in the opposite direction to tilt the same toward said second operative position.

2. A control system according to claim 1 which includes control relay means connected to said secondary winding means.

3. A control system according to claim 1, in which said yoke means is pivotally connected to said center one of said legs.

4. An electromagnetic control system according to claim 1, which includes a secondary winding means on the third one of said legs.

5. An electromagnetic control system according to claim 1, which includes over-center spring means operatively connected to said yoke means for assisting in the movement thereof into each of the said operative positions.

6. An electromagnetic control system according to claim 1, in which the said primary winding means is on the center one of said legs.

7. An electromagnetic control system according to claim 2, in which said relay means includes actuating control means and rectifier bridge means having input terminals connected to the terminals of said secondary winding means and output terminals connected to the terminals of said actuating coil means.

8. A control system according to claim 2, in which said relay means includes actuating coil means, said actuating coil means having its terminals connected to the terminals of said secondary winding means, and in which a condenser is provided which is connected across the terminals of said actuating coil means.

9. A control system according to claim 1, which includes secondary winding means on the third one of said legs, and which also includes high impedance means connected in circuit with said secondary winding means so as to maintain the flux conditions in said transformer core means substantially constant.

10. An electromagnetic control system including: frame means, transformer core means located in said frame means and having two outer legs and one leg intermediate the same, said legs being magnetically interconnected at their one ends while having their other ends spaced apart from each other, primary winding means on one of said legs and adapted to be electrically energized, secondary winding means on a second one of said legs, magnetically responsive yoke means arranged adjacent said other ends of said legs and alternately tiltable into first and second operative positions in which said yoke means respectively establishes a closed magnetic path from the other end of said intermediate leg to the other end of the respective outer leg of said core means while interrupting the magnetic path from the other end of the intermediate leg to the other end of the respective other one of said outer legs of said core means and, an actuating means comprising fork-shaped means movably mounted in said frame means and having two arms, said yoke means being provided with means loosely straddled by said arms, and said arms being spaced a sufficient distance apart so as to be operable after a lost motion of said arms relative to said yoke means to tilt the latter toward its respective operative position.

11. A control system according to claim 10, in which said distance between said arms is sufficient to permit snap movement of said yoke member into each of its operative positions when moved toward the respective position by said fork-shaped means.

12. A control system according to claim 10, which includes over-center spring means connected to said yoke means for assisting in the snap movement thereof into each of the said operative positions.

13. An electromagnetic control system including: frame means, transformer core means located in said frame means and having two outer legs and one leg intermediate the same, said legs being magnetically interconnected at their one ends while having their other ends spaced apart from each other, primary winding means on one of said legs and adapted to be electrically energized, secondary winding means on a second one of said legs, magnetically responsive yoke means arranged adjacent said other ends of said legs and alternately tiltable into first and second operative positions in which said yoke means respectively establishes a closed magnetic path from the other end of the respective outer leg of said core means while interrupting the magnetic path from the other end of the intermediate leg to the other end of the respective other one of said outer legs of said core means, said yoke means being provided with first surface means and also being provided with second surface means spaced from said first surface means, an actuating means movably arranged in said frame means and adapted to be actuated from the outside of the latter, said actuating means including first and second movable abutment means spaced from each other, said first and second abutment means being operable after a lost motion of said actuating means in one and the other direction to engage the respective surface means for tilting said yoke means toward the respective operative position.

14. A control system according to claim 13, in which said first actuating means is provided with first and second lost motion abutment means which are spaced from each other and operable after said lost motion of said actuating means in one or the other of said two directions to engage the respective adjacent movable abutment means to thereby cause the latter to tilt said yoke means toward the respective operative position by engagement with the respective surface means.

15. A control system according to claim 14, in which said actuating means includes shaft means reciprocably mounted in said frame means and supporting said first and second movable abutment means in spaced relationship to each other and on opposite sides of said first and second surface means, and also supporting said first and second lost motion abutment means in spaced relationship to said movable abutment means, said shaft means having fixedly connected thereto first stop means respectively arranged between respective adjacent movable abutment means and lost motion abutment means, first and second spring means arranged between said stop means and the respective adjacent movable abutment means and urging the same toward the respective adjacent surface means, said shaft having furthermore fixedly connected thereto second stop means arranged on that side of said first lost motion abutment means which is remote from the respective adjacent movable abutment means, third spring means arranged between said second stop means and said adjacent lost motion abutment means, and fourth spring means arranged between said second lost motion abutment means and said frame means.

References Cited

UNITED STATES PATENTS

| 2,134,517 | 10/1938 | Jones | 336—133 X |
| 2,136,798 | 11/1938 | Lucas | 336—176 X |
| 2,401,175 | 5/1946 | Morrill | 336—133 X |
| 2,563,899 | 8/1951 | Wiancko | 336—133 X |
| 3,154,756 | 10/1964 | Bojarski | 336—133 |
| 3,260,975 | 7/1966 | Howard | 336—133 |

JAMES D. TRAMMELL, Primary Examiner

U.S. Cl. X.R.

317—156; 336—132